(12) United States Patent
Jacobs

(10) Patent No.: US 6,547,405 B2
(45) Date of Patent: Apr. 15, 2003

(54) VEHICLE SIDE VIEW MIRROR BLIND SPOT ADJUSTMENT METHOD

(76) Inventor: Raymond A. Jacobs, 30181 Cheviot Hills Dr., Franklin, MI (US) 48025

(*) Notice: Subject to any disclaimer, the term of this patent is extended or adjusted under 35 U.S.C. 154(b) by 0 days.

(21) Appl. No.: 09/877,770

(22) Filed: Jun. 8, 2001

(65) Prior Publication Data

US 2002/0186480 A1 Dec. 12, 2002

(51) Int. Cl.[7] .......................... G02B 7/182; G02B 5/08; B60R 1/06
(52) U.S. Cl. ...................... 359/843; 359/838; 359/872; 359/900; 33/264
(58) Field of Search ................................ 359/839, 843, 359/872, 838, 900; 33/264

(56) References Cited

U.S. PATENT DOCUMENTS

| | | | | |
|---|---|---|---|---|
| 2,685,859 A | * | 8/1954 | Donnell | 116/320 |
| 2,871,754 A | * | 2/1959 | Marble | 359/838 |
| 2,881,655 A | * | 4/1959 | Eisenschink | 356/21 |
| 3,421,728 A | * | 1/1969 | Gordon | 248/477 |
| 3,513,807 A | * | 5/1970 | Helle | 116/306 |
| 3,565,033 A | * | 2/1971 | Helle | 116/28 R |
| 4,357,076 A | * | 11/1982 | Manzoni | 248/476 |
| 4,477,149 A | * | 10/1984 | Crespy | 411/144 |
| 5,097,362 A | | 3/1992 | Lynas | 359/843 |
| 5,189,537 A | * | 2/1993 | O'Farrell | 349/195 |
| 5,418,610 A | * | 5/1995 | Fischer | 356/21 |
| 5,644,442 A | * | 7/1997 | Lemere | 359/838 |
| 5,717,531 A | * | 2/1998 | Floyd | 340/425.5 |
| 5,745,310 A | | 4/1998 | Mathieu | 359/843 |
| 2002/0044065 A1 | * | 4/2002 | Quist et al. | 359/838 |

FOREIGN PATENT DOCUMENTS

| | | | | |
|---|---|---|---|---|
| DE | 2436094 | * | 2/1976 | 359/872 |

OTHER PUBLICATIONS

Reed, Matthew P.; Lehto, Michelle M.; and Flannagan, Michael J.; Report entitled "Field of View In Passenger Car Mirrors," The University of Michigan Transportation Research Institute Report No. UMTRI–2000–23, 2 pages, Jun. 2000. (Abstract).

Maltby, Gordon, Article entitled "Mirrors: A New Perspective," Car Mirror Safety, from GEICO Direct, Spring 1997, 3 pages (reprinted from Internet).

Texas Driver Education Classroom and In–car Instruction Model Curriculum, Module Two, "Preparing to Operate a Vehicle," pp. 76, 84–85. (No Date).

Article entitled "Mirror, mirror on the car, what's the best adjustment by far?", Spring Car Care, 1 page (reprinted from Internet). (No Date).

Article entitled "Correct Car Mirror Adjustment For Your Safety," Popular Science, Dec. 1992 (p. 43) (reprinted from Internet).

Article entitled "Split Wide–Angle Mirror Gives Safer Field of View," The Saab Network Press, dated Jun. 27, 1998, 3 pages (reprinted from Internet).

(List continued on next page.)

Primary Examiner—John Juba, Jr.
(74) Attorney, Agent, or Firm—Harness, Dickey & Pierce, P.L.C.

(57) ABSTRACT

An angularly adjustable, vehicle side view mirror having a reflective mirror member mounted within a frame that is attached to the driver or passenger side of an automotive-type vehicle. The frame has an outer edge member having a series of horizontally spaced apart markings that are visible to the driver within the vehicle. The mirror has an outer edge that is closely adjacent to the frame outer edge member and can be pivoted into visual alignment with anyone of the frame member markings. The alignment of the mirror edge with a pre-selected frame member marking positions the mirror for reflecting either a blind spot side area or an area closer to the vehicle side. The marks also guide the driver in setting the mirror to pre-selected angles whenever the particular pre-set angle has been changed.

18 Claims, 3 Drawing Sheets

OTHER PUBLICATIONS

Article entitled "Side Mirror Adjustment Safe Driving Aid," Naval Air Station Oceana, Regional Safety Office, Virginia Beach, VA, 2 pages (reprinted from Internet). (No Date).

Article entitled "Adjusting Your Mirrors Correctly," smartmotorist.com, 3 pages (reprinted from Internet). (No Date).

Woodsmall, Gary K., The Sentinel (Official Safety Newsletter of Civil Air Patrol), Feb. 1999 Edition, 2 pages (reprinted from Internet).

Article entitled "How To Adjust Your Mirrors," National Motorists Association, 3 pages (reprinted from Internet). (No Date).

Kline, Terry L., Article entitled "Efforts to Reduce Mirror Blind Spots," The Chronicle of ADTSEA, vol. 45, No. 4, Fall Issue 1997, 4 pages (reprinted from Internet).

Article entitled "Adjusting Your Vehicle's Side–View Mirror For Safety," U.S. Department of the INterior, Safety Net, 1 page (reprinted from Internet). (No Date).

Sales Literature for "Big Auxiliary Mirror," Hercules JRP, Inc. Stroudsburg, PA, 2 pages (reprinted from Internet). (No Date).

Article entitled "CamCar Technology From Ford Focused on Eliminating Blind Spots," IVsource.net, Oct. 16, 2001, 4 pages (reprinted from Internet).

Article entitled "Mirror, Mirror On The Car What's The Best Adjustment By Far?", Car Care Counsel, 1 page (reprinted from Internet). (No Date).

Article entitled "How to Banish Blind Spots," AAA Carolinas Go Magazine Online, 2002, 1 page (reprinted from Internet). (No Date).

Younger, Joseph D., Article entitled "How to Banish Blind Spots," from Car & Travel Monthly, reprinted by AAA Automobile Club of New York, 1999, 3 pages (reprinted from Internet).

Curriculum Scope and Sequence Modules for Driver Education in Virginia, Module Four, Aug. 2001, pp. 1, 26 and 27.

Platzer, George, Article entitled "A Simple Way to Prevent Blindzone Accidents," Public Affairs Committee of the Society of Automotive Engineers, 1996, 4 pages.

* cited by examiner

VEHICLE SIDE VIEW MIRROR BLIND SPOT ADJUSTMENT METHOD

BACKGROUND OF THE INVENTION

This invention relates to an improvement for a conventional automotive vehicle side view mirror which will enable the vehicle driver to quickly and accurately adjust the vehicle mirror into positions for either viewing a normal or conventional reflection of the area at the side of the vehicle or, optionally, viewing the side blind spot area which normally is not reflected in the conventional mirror setting.

Conventional side view mirrors that are mounted on either the driver's side or the passenger's side of an automotive type vehicle, such as an automobile, truck, or bus, generally comprise a housing which supports and provides a frame about a reflective mirror element. The mirror element or member typically is mounted within the housing or frame for angular adjustment around a horizontal axis or vertical axis or both. The vehicle driver may manually, by grasping or pushing the mirror member itself, turn it until it reflects the area to the side of, and rearwardly of that side, of the vehicle. Alternatively, in many vehicles, the adjustment of the mirror element is made by the vehicle driver manually moving or pushing a control button or lever which, in turn, operates a motor driven mechanism that responsively moves or turns the mirror into a driver desired angular position relative to the horizontal and the vertical. Either way, whether the adjustment of the mirror is performed by hand pressure applied directly upon the mirror member or by a mirror moving mechanism which is hand controlled by the driver, such manual adjustments typically are used to arrange the mirror at an angle which reflects the area closely adjacent the side of the vehicle.

In normal use, the side view mirror that is conventionally located at the passenger side of the vehicle, is set by turning the mirror so that a reflection of a portion of the vehicle side is visible to the driver while the reflection also shows the area which extends rearwardly and along the side of the vehicle. This enables the driver to see vehicles that are at the passenger side, but not in the blind spot. The conventional setting may also enable the driver to see the adjacent road edge or curb edge or the like for parking the vehicle.

The mirror located at the driver's side of the vehicle similarly is normally adjusted by the driver to reflect the side of the vehicle and the area at the far rear and side of the vehicle. In normal operation, the angularity of the mirror, is set by the driver when the driver is seated within the vehicle and then the mirror remains at that setting. The normal purpose of the permissible mirror adjustment is to enable different drivers within a particular vehicle to arrange the angle of the mirror to display the best rear and side view for a particular driver.

In the normal or conventional use of side view mirrors, the so called "blind spot", which is an area generally at the driver or passenger side of, and somewhat laterally spaced from the side of, a vehicle, is normally not visible in the reflection that appears on the mirror when the mirror angularity is conventionally set. Therefore, there are accidents and near accidents that occur because a driver, relying upon the side view mirrors and, in addition, to the rear view mirror which is within the vehicle, is unable to see in the mirrors a following vehicle which is located in the vehicle blind spot. In such conditions as changing lanes, or turning across a lane, an unseen vehicle that is located in a blind spot is the cause of numerous accidents or near accidents.

Further, the angular adjustment of a side view mirror is normally a matter of trial and error. That is, a driver when sitting in the driver's seat behind the steering wheel, must look at the side view mirrors on either side of the vehicle and adjust the angle for that particular driver's best view of the rear and side of the vehicle. Various attempts have been made to assist the driver in initially setting the particular angle of the side view mirror which is most comfortable and practical for that particular driver and later resetting the angle whenever the mirror angle has been changed. Examples of devices provided for the purpose of enabling a driver to re-set the mirror angle at a pre-selected or predetermined position are illustrated and described in U.S. Pat. No. 4,989,966 issued Feb. 5, 1991 to Kim for an "Adjustable Vehicle Side View Mirror" and U.S. Pat. No. 5,500,773 issued Mar. 19, 1996 to Easter for a "Vehicle Mirror Alignment Device". The first patent provides a flexible frame around the mirror member that grasps the mirror edges and clamps the mirror which may be set at markings located within the frame. Constriction of the frame around the mirror member is provided by a locking or adjustment mechanism which either tightens the frame around the mirror to maintain its desired angular position or, alternatively, is loosened to allow the mirror to be angularly adjusted. In the second patent mentioned above, a sighting or aiming device is applied upon the mirror, somewhat like a gun sight, which enables the driver to set the angle of the mirror by looking through the aiming device. In both of these patented devices, once the mirror is pre-set for conventional viewing, it remains that way for a particular driver until the mirror is reset by a different driver who wants a different angular viewing position. Then the mirror may again be re-set by the first driver.

In the patent to Thomas, U.S. Pat. No. 1,879,592 of Sep. 27, 1932, an interior or rear view vehicle mirror is provided with distance indicator markings. The driver may form markings on the mirror surface which visually correspond to objects located at varying distances behind the vehicle. In addition, a gage is provided for enabling a driver to angle the interior mirror to predetermined positions by aligning an edge of the mirror with the markings. This structure is designed for pre-setting the mirror and maintaining it in a fixed position for a particular driver who will then rely upon the markings formed on the mirror to estimate the distance of a following vehicle behind the driver's vehicle.

Attempts have been made to provide mechanisms by which a mirror may be adjusted, in some cases automatically, to view not merely the normal or conventional area behind the vehicle but also side areas which would include the blind spot area. An example of such a mechanism is illustrated in U.S. Pat. No. 5,914,824 issued Jun. 22, 1999 to Valentino for a "Rear View Mirror Apparatus And Method For Vehicle Lane Changing". This illustrates an automatic system for adjusting the angle of the mirror temporarily when the vehicle, such as a large truck, turns. Thus, the driver is provided with an image of the blind spot or area along the side of the truck as it makes a wide turn. The present applicant's previously filed patent application, U.S. Ser. No. 09/294,579 filed Apr. 20, 1999, now U.S. Pat. No. 6,193,380 issued Feb. 27, 2001, similarly focuses on an automatic system for temporarily viewing a reflection of the blind spot area, when a following vehicle enters the blind spot area of a leading vehicle.

Another example is disclosed in U.S. Pat. No. 5,097,362 issued Mar. 17, 1992 to Lynas for a mechanism for automatically changing the position of the mirror in response to the activation of the vehicle's turn indicator. But, this system is ineffective for viewing a vehicle's blind spot when the driver wishes to determine whether a vehicle is located in the blind spot during normal driving conditions.

The various devices contemplated for enabling a driver to temporarily view a blind spot area are relatively complex and contemplate changing or replacing the presently available side view mirror mechanisms or devices used on vehicles. The present invention contemplates providing an add-on device which can be utilized on pre-existing mirror constructions, whether those that are adjustable by direct hand pressure or by a hand controlled mechanism, to initially reflect a pre-determined side view area convenient to a particular driver and when desired, to temporarily view the blind spot area relative to the vehicle. The improvement may also be used reversely, that is, to normally view the blind spot area and temporarily view the conventionally viewed areas at either the driver's side or the passenger's side of the vehicle. Thus, little if any change is required for adopting the normal or conventionally available side view mirror to achieve these results.

SUMMARY OF INVENTION

This invention contemplates modifying a conventional vehicle side view mirror, which has a reflective mirror member positioned within a frame. The frame may be part of a housing that is mounted on the side of a vehicle. A series of horizontally spaced apart indicium or markings are formed upon the vertical portion of the frame which is most remote from the vehicle and which is visible to the driver. These markings form indicia in which the individual markings are spaced apart horizontally. The vertical edge portion of the mirror element, which is adjacent the frame portion, is arranged into alignment with one or another of the individual indicium. Since the mirror member can be angularly adjusted by the driver, either by directly manually moving it or by moving it manually through the use of a conventional hand operated control that operates a moving mechanism, as is common in many vehicles today, the vertical edge of the mirror can be aligned with one or another of the marks. Thus, alignment with one of the marks that is more to the rearward relative to the vehicle can be used to appropriately align the mirror edge to reflect the conventionally viewed rear and side area relative to the vehicle. However, angularly moving the edge of the mirror member into alignment into one of the more forward markings causes the mirror to reflect the blind spot area along the side of the vehicle. Consequently, in that position the presence of any following vehicles located in the blind spot would be visible to the driver.

The driver, upon entering the vehicle, may initially pre-set the mirror angle, if it is not already pre-set, to reflect either the conventional rear-side view or the blind spot view. Preferably, where the driver has an unobstructed rear view on the conventional interior rear view mirror that is normally located at the upper portion of the vehicle windshield in front of the. driver, as is common in most vehicles, the driver could set the side view mirrors to normally view the blind spots on either side of the vehicle. In that case, the driver may only use the interior rear view mirror to see the rear of the vehicle and simultaneously use the side view mirrors to see the blind spots. When desired the driver may reset the side view mirrors, by turning them into alignment with the particular mark or indicium that the driver had pre-selected.

An object of this invention is to provide a simple, inexpensive, system by which a vehicle driver may temporarily adjust the side view mirrors of a vehicle for viewing, either the blind spot area or the conventional side view area of the vehicle, without any substantial modification of the mirror structure.

Another object of this invention is to provide a means by which the driver of a vehicle may normally, if desired, view the blind spot areas of a vehicle, while relying upon the.inner or interior mirror to view the rear of the vehicle, and to preset the mirror into the best viewing position for the particular driver for blind spot viewing or alternatively for normal side viewing.

Still another object of this invention is to provide a simplified modification which inexpensively provides a system by which a driver of a vehicle may accurately and quickly reset the driver's or passenger's side view mirrors by simply adjusting the angularity of the mirror, within its frame, to visually align an edge of the mirror with a pre-selected visible marking applied upon the mirror frame.

These and other objects and advantages of this invention will become apparent from the detailed description, of which the attached drawings form a part.

DESCRIPTION OF THE DRAWINGS

The present invention will become more fully understood from the detailed description and the accompanying drawings, wherein.

DETAILED DESCRIPTION

The following description of a preferred embodiment is merely exemplary in nature and is not intended to limit the invention, its application, or uses.

Figure 1:
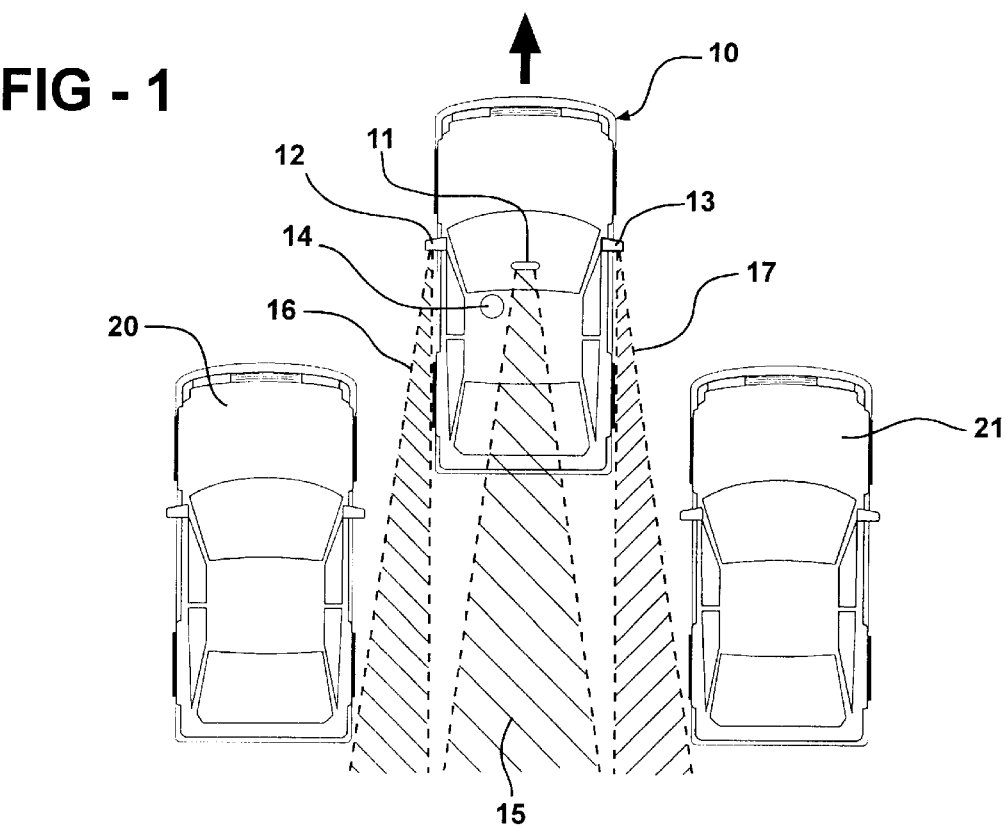
FIG. 1 schematically illustrates a plan view of a leading automobile with following vehicles located on opposite sides thereof and schematically showing the normally viewed areas along the sides and rear of the vehicle whose visible reflections are produced by the conventional settings of the side view mirrors and the interior rear view mirror.

FIG. 1 schematically illustrates a conventional automotive vehicle, such as a passenger automobile 10, having an interior or inside rear view mirror 11 and side view mirrors 12 and 13 fastened to the vehicle driver's and passenger's sides. A driver 14 is schematically shown within the vehicle in the approximately normal driving position.

The shaded portion 15 generally illustrates the location of the rear view area that is reflected by the interior rear view mirror 11 so as to be visible to the driver seated within the vehicle. Similarly, the shaded areas 16 and 17 schematically illustrate the conventional side view areas reflected to the driver by the mirrors 12 and 13 respectively. These side view areas typically include a portion of the respective sides of the vehicle as well as extending a considerable distance to the rear of the vehicle.

For illustration purposes, a vehicle 20 is arranged as a following vehicle in the blind spot of the vehicle 10, that is the area which is to the rear and to the side, such as in the next lane, relative to the vehicle 10. The following vehicle 20 normally would not be visible to the driver 14 in either the side view mirror 12 or the rear view mirror 11. Similarly, a following vehicle 21 is schematically shown in the blind spot area on the passenger side of the vehicle. Similarly, the vehicle 21 would not ordinarily be visible to the driver 14, even though it is relatively close to the vehicle 10. The presence of the momentarily invisible following vehicles 20 and 21 in the blind spots of the vehicle 10 creates the problem, mentioned above. That is, the driver 14 of vehicle 10 may veer into either of the lanes adjacent the sides of the vehicle or may make a turn without being aware of the presence of the following vehicles. That could result in an accident or a near accident if the drivers in the following vehicles are not sufficiently alert to apply their brakes or to swerve to avoid an accident. Thus, it would be highly desirable to enable the driver 14 to see the following vehicles that are located in the blind spot either at all times when normally driving or at least temporarily, as desired.

Figure 2:
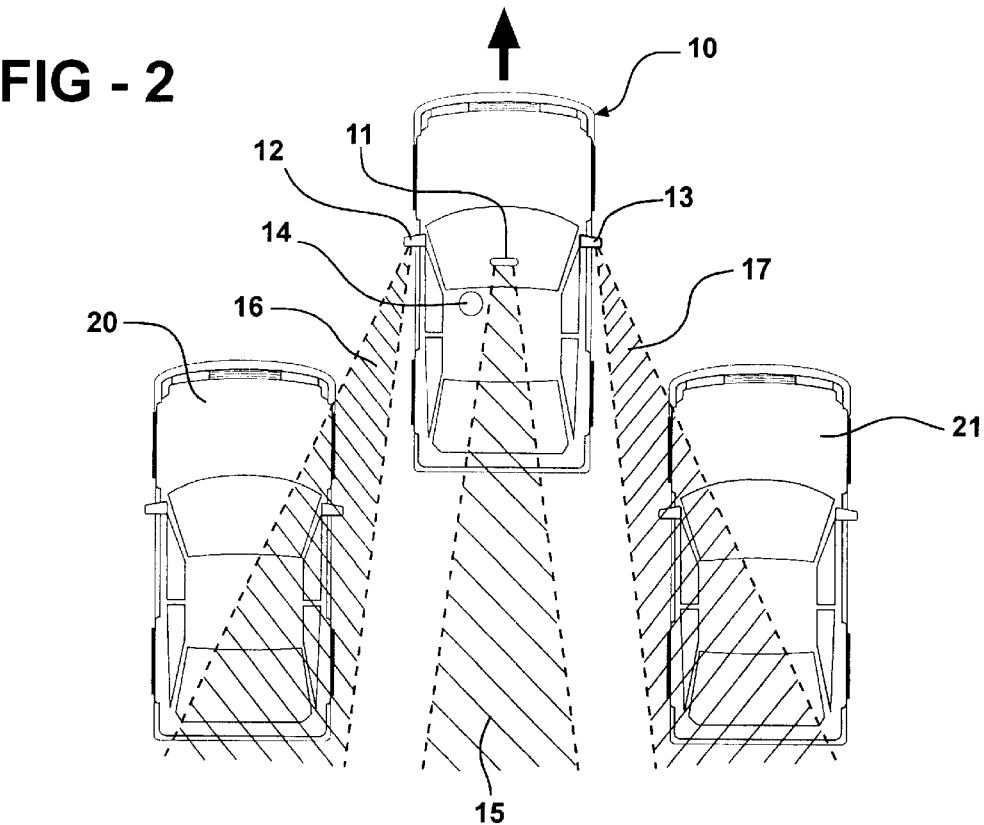
FIG. 2 is a schematic view similar to FIG. 1, but illustrates the side view mirrors angularly adjusted so as to provide an image of the following vehicles that are located in the blinds spots on the opposite sides of the subject vehicle.

FIG. 2 illustrates the adjustment of the side view mirrors so as to reflect the vehicles 20 and 21 within their blind spot viewing areas 24 and 25. Since the driver would normally have the rear view mirror 11 available, assuming that the view to the rear, as reflected by a mirror 11, is not blocked by a towed trailer or other towed vehicle or by some portion of the vehicle 10, the driver may rely upon the blind spot settings of either the driver's side mirror 12 or the passenger's side mirror 13 to alert the driver to a following vehicle that might be in a position to cause an accident. Thus, the driver may set the two side view mirrors to normally view the blind spot areas and rely upon the rear view mirror 11 solely for a direct rear, view. Conversely, the driver may choose to set the side view mirrors for conventional viewing and then, when desired reset the mirrors for blind spot viewing.

Figure 3:
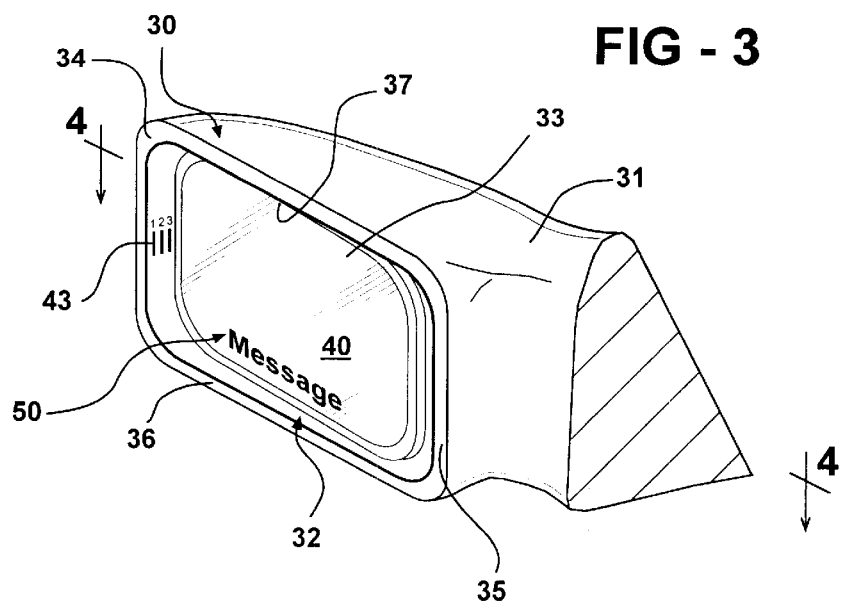
FIG. 3 is a schematic view of a conventional mirror housing with a mirror member arranged within the frame of the housing and showing the relationship between the mirror member and the indicia formed on the frame.

As mentioned, the mirror construction is preferably conventional and may vary considerably in its structural design or shape or appearance. Thus, a conventional mirror housing 30, which is schematically illustrated in FIG. 3, is provided with a portion 31 formed for fixed attachment to the side of the vehicle. There are numerous attachments used with conventional side view mirrors. Thus, particular attachment or housing structure is immaterial to the present invention. However, the housing may include an integral frame portion 32 within which the mirror member 33 is positioned. The frame may be an integral part of the housing or a separate frame with a suitable backing may form a combined housing and frame. All these are conventionally available.

The frame portion of the housing, or an independent frame, as the case may be, is provided with a vertical outer edge member 34, an inner edge portion 35, a lower edge member 36 and an upper edge member 37. The outer edge member 34 of the frame is the roughly vertical portion of the frame, although the precise shape of that portion is not material. For example it may be curved or rounded. The outer edge member preferably is the frame portion that is most remote from the side of the vehicle and which is visible-to the driver of the vehicle.

Figure 4:
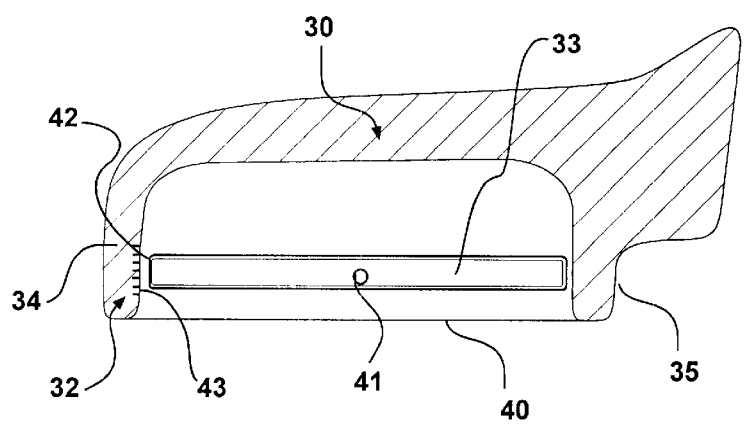
FIG. 4 is a schematic, cross-sectional view taken in the direction of arrows 4—4 FIG. 3.
Figure 5:
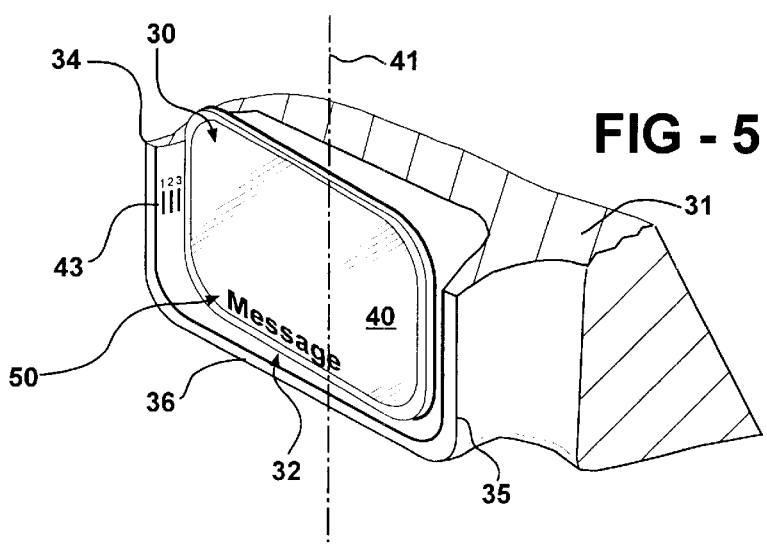
FIG. 5 is a schematic, partially cross-section view illustrating the mirror member positioned within its frame.

The mirror member 33 is arranged within the frame and has an exposed mirror surface 40 which reflects a visual image of the area to the side and behind the vehicle. The mirror 33 is conventionally mounted within the frame or housing by a mechanism or member which permits angular adjustment, usually both vertically and horizontally. Schematically, a pivot 41 is illustrated in FIG. 4 to symbolize the vertical axis of the adjustment device of the mirror. The particular device or mounting mechanism which enables the turning or movement of the mirror varies depending upon the particular mirror construction. That mechanism or device forms no part of the present invention. However, as is schematically shown, the adjustment or turning of the mirror relative to a vertical axis, symbolized by the symbolic pivot 41 is relied upon for adjustment of the mirror in the manner disclosed herein. Thus, the pivot axis is symbolically illustrated by the dotted line 41 in FIG. 5 and the point or top view of line 41 marked in FIG. 4.

The mirror outer edge portion 42 which normally has a generally vertical portion is arranged relatively close to the frame outer edge member 34. Indicia 43, formed of a series of horizontally spaced apart individual markings or indicium (see FIG. 5) are arranged on the frame portion 34. The indicia are so arranged as to be visible to the driver within the vehicle. A corresponding mark or arrow 45 or similar such mark may be provided on the mirror surface 40 to enable easier visual alignment with the mirror edge 42 and one or another of the indicium 43. Preferably a series of numbers or letters are placed upon the frame members 34 adjacent to the individual marks or in place of individual marks so as to provide clearly visible alignment positions.

Figure 6:
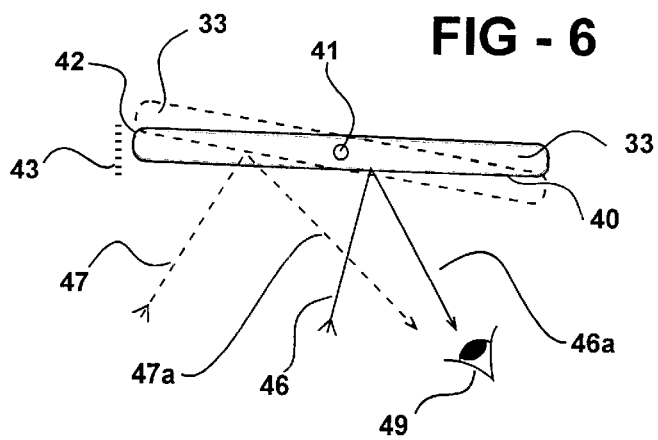
FIG. 6 is a schematic view illustrating the turning movement of the mirror member relative to the frame indicia and with arrows schematically indicating the reflection and viewing of the mirror surface.
Figure 7:
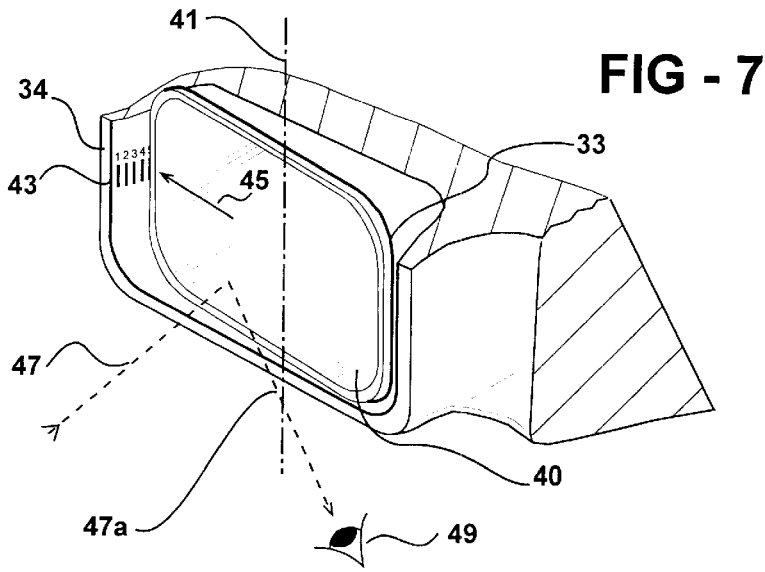
FIG. 7 is a schematic view showing the mirror edge aligned with a forwardly located indicium which results in reflecting the blind spot to the driver.
Figure 8:
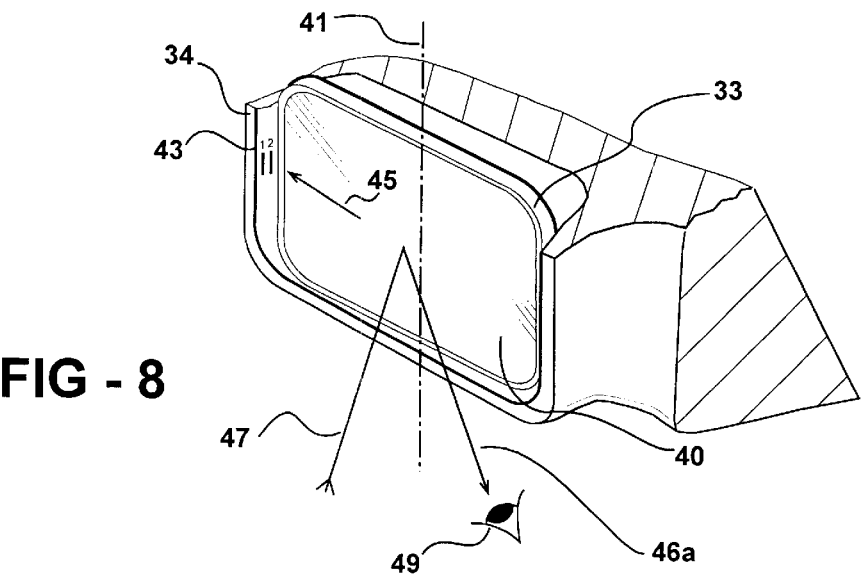
FIG. 8 is a schematic view, similar to FIG. 7, but with the mirror edge aligned with a more rearwardly located indicium to reflect a conventional driver.

Typically, the individual markings or indicium provide two groups, the first being a group of markings that are nearer to the forward direction of the vehicle and the second being the markings that are nearer to the rear direction of the vehicle. Thus, as indicated schematically in FIG. 6, when the mirror edge 42 is aligned with one of the indicium 43, the mirror reflective surface 40, depending upon which indicium is selected, will either reflect the conventional rear view area, for example the area 16 shown in FIG. 1, or the blind spot area, for example, area 24 shown in FIG. 2. As schematically shown in FIGS. 6 and 8, the incident or incoming light rays 46 and the reflectied rays 46a (which the driver views in the mirror 40) cause the conventional side view display 16 that is seen by the driver's eye 49. The edge 42 of the mirror is aligned with one of the rearward, e.g. lower, numbers. FIGS. 6 and 7 schematically illustrate the mirror edge 42 aligned with a forward, e.g. higher number, mark wherein the incident (i.e. incoming) rays 47 and the reflective rays 47a display a blind spot image to the driver's eye 49.

The markings or indicia may be applied upon the mirror frame when the mirror is manufactured or may be separately painted or applied thereon. Thus, for application to an already installed vehicle mirror, the indicia 43 may be hand scratched or hand painted upon the frame portion 34. Alternatively, the markings may be imprinted upon a tape or adhesive backed sheet such as a paper or plastic sheet, which can be adhered to the mirror frame, to provide the necessary marks for guiding the driver in setting the mirror edge relative to the particular markings desired. In this manner, after the driver initially determines which markings give the driver the best views for blind spot and conventional area viewings, at later times the driver may quickly set the mirror to those marks upon entering the vehicle or when driving. Also, a different driver may easily reset the mirror angles as desired for that driver's viewing.

To instruct the drivers about the how to make the blind spot angle adjustment, a short message 50 may be etched upon the mirror member, for example, on the driver's side mirror. Alternatively, a suitable message may be imprinted directly upon, or upon a card or tape that is adhered to, the portion of the vehicle in front of the driver, such as upon the center of the steering wheel or upon the conventional sun visor.

This invention may be further developed within the scope of the following claims. Therefore, it is desired that the description herein be merely descriptive of an operative or preferred embodiment of this invention and not in a strictly limiting sense.

Having fully described at least one preferred embodiment of this invention; I now claim:

1. A vehicle side mirror that instructs drivers how to angularly adjust said mirror between predetermined angular positions for reflecting rearward views of an area close to the side of a vehicle as is conventional or alternatively, a blind spot area laterally spaced from the side of a vehicle, comprising:

a mirror frame having an attachment portion for fixed attachment to a side of a vehicle;

said mirror frame including an outer side member having a substantially vertically arranged portion that is viewable by a vehicle driver within the vehicle;

visible spaced apart markings formed on said outer side member portion, with the markings being spaced apart horizontally relative to each other;

a mirror member moveably mounted within the frame and being angularly adjustable about a vertical axis;

an instructive message formed upon the mirror member that is viewable by a vehicle driver within the vehicle;

said mirror member having an outer edge located closely adjacent to, and in vertical alignment with, said outer side member portion;

said mirror outer edge being moveable in generally forward and rearward horizontal directions, relative to the vehicle upon which the frame is attached, into visible alignment with one of said markings;

said markings being so located that visual alignment of the mirror edge with a forward marking reflects, to the vehicle driver, the blind spot area laterally spaced from the side of the vehicle, and visual alignment of the mirror edge with a rear marking reflects an area close to the side of the vehicle as is conventional;

and said instructive message providing guidance to said driver for quickly adjusting said mirror outer edge relative to said markings to adjust said mirror member between views of said conventional and said blind spot rearview areas.

2. A vehicle side view mirror as defined in claim 1 and said markings being formed of a series of horizontally spaced apart indicium, whereby the driver of the vehicle may adjust the angle of the mirror member for visually aligning the mirror member outer edge with a selected marking indicium for temporarily pre-setting the side area which the drive wishes to view in the mirror.

3. A vehicle side view mirror as defined in claim 2, and including numerical designations formed at each indicium to visually identify each indicium for rapidly adjusting the mirror angle.

4. A vehicle side view mirror as defined in claim 3, and including a mark formed at the edge of said mirror member for indicating the particular marking on the frame member with which the mirror edge is temporarily aligned.

5. A vehicle side view mirror as defined in claim 2, and including said mirror edge having a portion which is substantially vertical for vertical alignment with the adjacent portion of the outer side member.

6. A vehicle side view mirror as defined in claim 2, and including said mirror being manually adjustable by the vehicle driver for angularly moving for aligning the mirror member outer edge portion into alignment with any one of the marking indicia.

7. A vehicle side view mirror as defined in claim 6, and said frame being formed within, and being a part of, a housing having a portion formed for fixed attachment to a driver or passenger side of an automotive type vehicle for enabling the vehicle driver, while seated within the vehicle, to visually observe the area reflected by the mirror member, the markings on the frame, the instructive message upon the mirror member and the alignment of the mirror outer edge with any one of the driver selected markings.

8. A vehicle side view mirror as defined in claim 1, wherein the visible spaced apart markings are formed on said outer side member portion by being imprinted upon a sheet which is adhered to the mirror frame.

9. In a vehicle side view mirror having a frame for attachment to the side of a vehicle and a reflective mirror member mounted within the frame and being pivotally adjustable about a substantially vertical axis relative to the frame, and the frame having a substantially vertically arranged outer frame side member located closely adjacent an outer substantially vertical edge portion of the mirror member, the improvement comprising:

indicia, in the form of spaced apart markings, formed upon said frame outer side member adjacent said mirror member side edge;

an instructive message formed upon the mirror member that is viewable by a vehicle driver within the vehicle;

said mirror member being pivotally moveable so that the mirror side edge is arranged in alignment with selected indicium to thereby angle the mirror relative to the frame so as to change the area reflected by the mirror and viewed by the vehicle driver;

with at least one of the indicia being located to position the mirror member for reflecting a conventional rear view of the area that is closely adjacent the vehicle side upon which the mirror frame is attached while at least another indicium is located to position the mirror member for reflecting a blind spot laterally spaced from the side of the vehicle;

and with said instructive message providing guidance to said driver for quickly adjusting said mirror member relative to said indicia for alternately reflecting said conventional rear view and said blind spot areas.

10. A vehicle side view mirror as defined in claim 9, and including said mirror member being manually adjustable by the vehicle driver for aligning the mirror member outer edge portion with a pre-selected indicium for thereby changing the area viewed by the driver.

11. A vehicle side view mirror as defined in claim 9, and said indicia being formed as a series of horizontally spaced apart separate indicium, whereby the driver of the vehicle may adjust the angle of the mirror member relative to the vertical for visually aligning the mirror member outer edge with a selected indicium for temporarily selecting the side area which the driver will view in the mirror member.

12. A vehicle side view mirror as defined in claim 11, and said frame being formed within a housing having an attachment portion for fixedly securing the housing upon the driver or passenger side of an automotive type vehicle for enabling the vehicle driver to visually observe the area reflected by the mirror member and to visually observe the indicia and the alignment of the mirror outer edge with any one of the drivers selected indicium.

13. A vehicle side view mirror as defined in claim 9, wherein the indicia, in the form of spaced apart markings, are formed on said frame outer side member by being imprinted upon a sheet which is adhered to the frame.

14. A method for instructing drivers how to quickly adjust a vehicle side view mirror for enabling the vehicle driver to optionally view either the rearward blind spot area laterally spaced from the side of the vehicle or alternatively, the conventionally viewed rearward area that is generally close to the side of the vehicle, comprising the steps of:

providing a side view reflective mirror member;

moveably mounting the mirror member within a frame which is formed for fixed attachment to the side of, and outside of, a vehicle, so that the mirror member may be angularly turned about a substantially vertical axis;

positioning the outer edge of the mirror member, that is, the mirror edge that is most remote from the vehicle side, adjacent a vertically arranged portion of the frame which is remote from the side of the vehicle and visible to the driver within the vehicle;

providing indicia formed of horizontally spaced apart marks upon said frame portion;

providing an instructive message formed upon the mirror member that is visible to the driver within the vehicle which provides guidance to the driver for quickly adjusting said mirror member relative to said indicia for alternately reflecting said conventional and said blind spot areas;

turning the mirror member as directed by said instructive message so that its outer edge is in visible alignment with one of said marks for selectively, temporarily reflecting a visual image to the driver of either the conventional or blind spot areas.

15. A method as defined in claim 14, and including forming said indicia in a series of multiple, horizontally spaced apart marks provided upon said frame portion;

locating at least some of the marks, when the mirror edge is aligned with one of those marks, to reflect a corresponding conventional or blind spot area viewable reflection in order to selectively accommodate a particular vehicle driver in viewing a desired conventional or blind spot area at the side of the vehicle.

16. A method as defined in claim 15 and including forming such marks with a series of visible numerals and aligning the mirror edge with pre-selected numerically designated marks for obtaining selected reflections.

17. A method as defined in claim 14, and including forming a series of indicium arranged as horizontally spaced apart distances from each other, on said frame portion;

pre-locating some of the indicium for positioning the mirror edge when aligned therewith, to reflect a corresponding image of a portion of the area to the rear and side of the Vehicle to enable the vehicle driver to pre-select and temporarily view a portion of the area to the side and rear of the vehicle by turning the mirror and setting its outer edge in alignment with one of the indicium.

18. A method as defined in claim 14, wherein the indicia formed of horizontally spaced apart marks, are formed on said frame portion by being imprinted upon a sheet which is adhered to the frame.

* * * * *